United States Patent [19]

Panoz

[11] 4,047,730
[45] Sept. 13, 1977

[54] MOTORCYCLE FRAME

[76] Inventor: David M. Panoz, 2669 E. 75th Street, P. O. Box 165, Chicago, Ill. 60617

[21] Appl. No.: 629,488

[22] Filed: Nov. 6, 1975

[51] Int. Cl.² ............................................. B62K 11/10
[52] U.S. Cl. ............................ 280/281 LP; 180/33 R
[58] Field of Search ..................... 280/281 R, 281 LP; 180/30, 33 R

[56] References Cited

U.S. PATENT DOCUMENTS

| 2,194,103 | 3/1940 | Tibbals | 180/33 R |
| 3,016,967 | 1/1962 | Rehfeld | 280/281 LP |

FOREIGN PATENT DOCUMENTS

| 947,613 | 7/1949 | France | 180/30 |
| 162,315 | 5/1921 | United Kingdom | 180/30 |

Primary Examiner—Joseph F. Peters, Jr.
Assistant Examiner—Terrance L. Siemens
Attorney, Agent, or Firm—Kinzer, Plyer, Dorn & McEachran

[57] ABSTRACT

A motorcycle frame including a pair of symmetrically situated frame sections, each including an elongated frame tube extending from a steering post in the front to the rear of the frame. Steering post support portions of the tubes are connected to the steering post and flare rearwardly, laterally outwardly and downwardly therefrom into parallel run portions arranged in a spaced apart relationship through a medial portion of the frame to define the bottom of a passenger compartment. Rearwardly of the passenger compartment, a tube of each frame section has an inclined portion reaching upwardly approximately to the height of the steering post and then rearwardly to define the top of an engine compartment. A frame cross member laterally spans the frame rearwardly of the steering post support portion and is fastened to one tube of each frame section.

11 Claims, 4 Drawing Figures

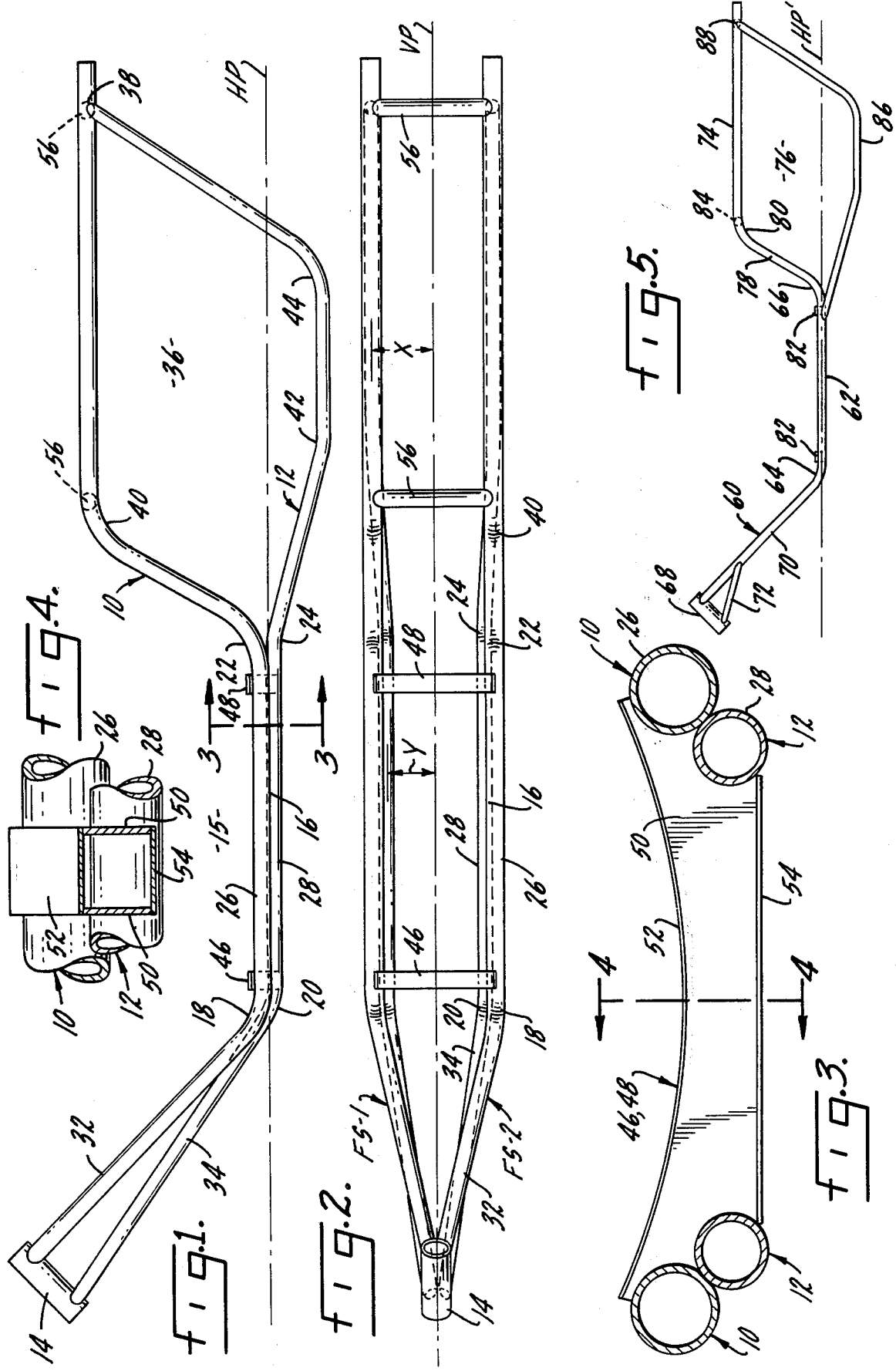

MOTORCYCLE FRAME

BACKGROUND OF THE INVENTION

This invention relates in general to motorcycles and more particularly to motorcycle frames.

Motorcycles have long been a popular means of transportation, partly because their small size and construction makes them a very maneuverable and efficient motor vehicle. Although motorcycles have been constructed of various shapes, sizes and designs, they all have one element in common, namely some type of structural frame which is supported by the front and back wheels and which in turn, supports the rider and power source. The most common type of motorcyle frame at the present time is one which carries the engine generally centrally between the front and rear wheels and which provides support means for seating the passenger above the engine.

Despite the popularity of such motorcycle frames, there are several heretofore unresolved problems characteristic of this type of motorcycle frame construction. Due to the fact that such frames are generally almost as tall as they are long, excluding the front wheel fork, they tend to take on a somewhat boxy shape with ample vertical reinforcing members to produce a rigid structure. This is generally the intended result with the idea that the motorcycle suspension means, rather than the frame, should provide any desired comfort by absorbing the vertical forces induced by travel over rough surfaces.

Accordingly, it is one object of the present invention to construct a motorcycle frame which itself has inherent flexibility for increased rider comfort.

Such ample frame reinforcement also tend to complicate the design of the motorcycle since the additional structural members must be designed around in order to position the various other parts and accessories of the motorcycle. It is another object of the present invention therefore to provide a frame having a simplified uncomplicated construction which permits considerable variation in the design of the motorcycle to be built thereon. Besides the rigidity of such frames, an almost universal passenger discomfort is the positional relationship of the rider directly above the motorcycle engine. The rider must be ever cautious that his lower extremities are not scorched by accidental contact with the very hot exposed surfaces of the motorcycle engine such as the exhaust pipes, cooling fins or engine block itself. Even regardless of proper safeguards to prevent physical contact with the motorcycle engine, a rider is nevertheless subject to the constant heat and noise exposure to the engine over which he is seated. It is therefore a further object of the present invention to provide a motorcycle frame adopted to situate the rider and passenger in front of the motorcycle engine in order to prevent physical contact and exposure to the heat and noise incident to a running motorcycle engine.

The performance of the motorcycle is also somewhat stifled by the conventional frame design described above. A rider, seated above the motorcycle engine, with his legs spread to straddle the engine, presents additional wind-resisting surfaces which require valuable energy of the motorcycle engine to be consumed resisting the resultant increased passenger wind resistance. Furthermore, the rider or rider and passenger, who are situated on a padded saddle mounted above the engine, tend to elevate the center of gravity of the motorcycle substantially above the axle centerline. The higher the center of gravity is above the axle centerline, the less stable the vehicle becomes. Another object of the present invention is thus to provide a motorcycle frame on which the rider and passenger may be situated close to the axle centerline of the motorcycle and longitudinally in line with the motorcycle engine, thereby to substantially reduce wind resistance and to minimize the rider's effect of elevating the motorcycle's center of gravity. Referring now to the longitudinal dimensions of the conventional frame, it will be observed that the torque exerted by the rear wheel during acceleration, which would tend to raise the bike up onto its rear wheel alone as in the "wheely" position, must be resisted almost entirely by the weight of both the passengers and engine acting through one and the same length of leverage arm, since they are positioned one above the other. It is an object of the present invention to permit increased acceleration of the motorcycle by positioning the engine and rider so as to have a greater torque resistant effect.

Specifically, in accordance with the present invention, flexibility is imparted to the motorcycle frame of the present invention by its elongated construction including a plurality of frame tubes running through substantially the entire length of the frame and so constructed as to provide support portions for a rider and passenger in front of the intended engine compartment, as opposed to the conventional position above it. The frame consists of a pair of frame sections, each including at least one frame tube, with the frame sections situated generally symmetrically about a longitudinal vertical plane located between the frame sections. The tubes of each section are juxtaposed one to another substantially in a parallel run relation at a medial portion of the frame to define the bottom of a passenger compartment, with the parallel runs being laterally opposite one another and within the same horizontal plane. Steering post support portions of the tubes are rigidly connected to a steering post and extend rearwardly therefrom flaring laterally outwardly and downwardly into the parallel runs. Rearwardly of the parallel runs, tubes of each pair of frame sections incline vertically upwardly and extend rearwardly to define an engine compartment which is thus located behind the passenger compartment and mostly above the horizontal plane.

With the passengers thus positioned in front of rather than above the engine compartment, the dangerous possibility of passenger contact with the engine while running is practically eliminated and the passengers are removed from the noise and heat of the engine. In this connection, since the passengers are seated on approximately the same horizontal plane which underlies the greater portion of the engine compartment, the weight of the passengers has little or no effect of elevating the center of gravity of the motorcycle vehicle, which results in greater ride stability. A further characteristic of such an arrangement is, of course, that wind resistance is minimized since the rider is positioned substantially within the wind resisting area of the motorcycle itself. The simplicity of the structure of the present invention results from the comstruction of the elongated frame tubes which may be the only longitudinally directed members of the frame. Lateral reinforcement may be provided simply by one or more frame cross members laterally spanning the motorcycle frame rearwardly of the steering post support and fastened to at least one tube of each frame section. In order to permit increased acceleration of the motorcycle, the motorcycle frame of the present invention is so constructed that the weight of the passengers, positioned in front of the motorcycle engine, thus acts through a longer leverage arm than the engine. The forces which resist the moment created about the rear wheel upon acceleration are thus increased and the probability of raising the front end of the cycle while accelerating is substantially reduced.

BRIEF DESCRIPTION OF THE DRAWINGS

FIG. 1 is a side elevation view of a motorcycle frame constructed according to the present invention.

FIG. 2 is a top plan view of the motorcycle frame of FIG. 1.

FIG. 3 is an enlarged front sectional view taken along line 3—3 of FIG. 1.

FIG. 4 is a side sectional view taken along line 4—4 of FIG. 3.

FIG. 5 is a side elevation view of a modified form of motorcycle frame constructed according to the present invention.

DESCRIPTION OF THE PREFERRED EMBODIMENTS

A motorcycle frame constructed in accordance with the present invention is shown in FIGS. 1 and 2. The frame consists of a pair of frame sections, designated FS-1 and FS-2, which are situated generally symmetrically about a longitudinal vertical plane VP located between the frame sections. Because of the generally symmetrical construction, and for convenience and clarity in the drawings and following description, a single reference character will be used to identify corresponding parts of each frame section.

The simplified preferred construction shown in FIGS. 1 and 2 includes only four frame tubes, an upper frame tube 10 and a lower frame tube 12 of each frame section, a steering post 14 and four frame crossmembers which are described in further detail below. The upper and lower frame tubes 10 and 12 of each frame section are juxtaposed to one another substantially in a parallel run relation at a medial portion of the frame to define the bottom of a passenger compartment 15. The parallel run 16 of each frame section thus extends from first bends 18 and 20 in the upper and lower frame tubes respectively rearwardly to second bends 22 and 24 in the upper and lower frame tubes respectively. To clarify, the term parallel run 16, in the embodiment shown, refers to a longitudinal portion of each frame section between the first and second bends of its respective frame tubes. The portions of the upper and lower frame tubes which make up the parallel run are referred to as parallel run portions 26 and 28 respectively. The parallel runs are spaced apart laterally opposite one another and within a single horizontal plane, designated HP in FIG. 1.

To connect the frame tubes and thereby fix their positional relationship at the front end of the frame, front designating the left end of the frame as seen in FIGS. 1 and 2, a steering post 14 is rigidly connected to one end of the frame tubes. Steering post 14 also, of course, serves to receive and retain a motorcycle front wheel fork. The front wheel fork is a separate inverted Y-shaped member which connects the frame to a front wheel and which may be rotated within the steering post to steer and balance the motorcycle. In order to maintain the symmetrical relationship of the frame sections, the steering post is generally centered within the vertical longitudinal plane VP such that its axis coincides with the plane. The angular orientation of the steering post is not critical to the present invention but is rather a matter of design choice. It does affect the wheelbase of the motorcycle however, in that the further the bottom of the steering post is tilted forward from its vertical position, the longer the wheelbase will be.

In order to connect the steering post 14 with the parallel runs 16 of each frame section, the upper and lower frame tubes 10 and 12 of each frame section are constructed to include steering post support portions 32 and 34 respectively which extend rearwardly from the steering post and flare laterally outwardly and downwardly therefrom. It is preferred that the steering post support portions 32 and 34 are not separate members, but rather are integral continuous lengths of the upper and lower frame tubes 10 and 12 respectively. The steering post support portions thus extend from the front end of the tubes rearwardly through the first bends designated 18 and 20. Again, the exact angular orientation of the steering post support portions is not critical to the present invention, but is also a matter of design choice.

Rearwardly of the parallel runs 16, the upper and lower frame tubes of each frame section bend, as at 22 and 24, and vertically diverge apart and converge back together to define an engine compartment 36. The engine compartment 36 is located longitudinally behind the passenger compartment 15 and mostly above the horizontal plane HP. The upper and lower frame tubes 10 and 12 of each frame section are rigidly connected adjacent the rear end of the frame at their point of convergence 38 by welding or any other suitable means. In the preferred form shown, upper frame tube 10 is inclined rearwardly and rather steeply vertically from second bend 22 and extends approximately to the height of steering post 14. At this point, a third bend 40 is formed in the upper tube, rearwardly of which the tube extends generally horizontally to the point of convergence 38 with the lower frame tube. Upper frame tube 10 may extend rearwardly beyond the point of convergence 38 for any length desired.

The bottom of the engine compartment 36 is defined by the rear ends of the lower frame tubes 12. Each lower frame tube 12 is preferably bent at 24 to extend rearwardly and slightly downwardly to a third bend 42 from which the lower frame tube continues generally horizontally for a short distance to a fourth bend 44. Rearwardly of bend 44, the lower tube 12 is inclined upwardly in converging relationship to the upper frame tube 10 and extends to the point of convergence 38.

Lateral reinforcement for the motorcycle frame of the present invention is provided by one or more frame cross members which also serve to maintain the proper lateral spacing between frame sections FS-1 and FS-2. In FIG. 2, two such frame cross members 46 and 48 are shown in positions adjacent the front and rear ends of the parallel runs 16. Each cross member laterally spans the motorcycle frame rearwardly of the steering post support portions 32 and 34 and is fastened to at least one tube of each frame section. For simplicity and uniformity, cross members 46 and 48 may be constructed identically, as shown, although this is not essential. A preferred construction of cross members 46 and 48 is shown in FIGS. 3 and 4. Each cross member, as shown, includes a pair of spaced apart vertical transverse plates 50 connected by top and bottom plates 52 and 54 to form a generally enclosed frame section. The various plates may be welded together continuously along their seams or spot welded or otherwise rigidly connected to create a strong structural member. The sides of vertical plates 50 are provided with two arcuate cutouts adapted to conform to the inner peripheral surfaces of the frame tubes 10 and 12 of each frame section. Again, the cross members may be welded in place continuously along the arcuate line of contact with the frame tubes, spot welded, or otherwise secured to one or both tubes of each frame section. In FIG. 3, it can be seen that although the bottom plate 54 is generally flat, the top edges of the vertical plates 50 are arcuate and concave to receive the somewhat bowed top plate 52. This shape is preferred because of its adaptability for assembling a safe and comfortable passenger compartment thereon.

Additional lateral reinforcement may be provided through the engine compartment by one or more rear crossbars 56 (FIG. 2) which laterally span the engine compartment and are attached to at least one frame tube of each frame section. Crossbars 56 are shown as generally tubular members with somewhat saddle shaped ends to conform to the inner periphery of the upper frame tubes 10 to which they are welded or otherwise attached. In some embodiments, no rear crossbars may be necessary since the engine itself may provide substantial reinforcement through the engine compartment portion of the frame.

The upper and lower frame tubes 10 and 12 of each frame section are preferably elongated generally cylindrical members. The word tubes is not intended to be limited to that particular shape since solid or linear sided members may be useful in certain embodiments of the motorcycle frame of the present invention. Nevertheless, the elongated cylindrical members are particularly adaptable for frame tubes for which strength and weight are conflicting criteria. As in any motor vehicle, it is desirable to minimize the weight of the frame while maximizing its strength and durability. In this connection, it has been found that generally thin-walled chrome-molybdenum members strike a favorable balance. Although the material itself is not particularly light, it is strong enough that it may be formed into thin-walled members having sufficient strength for a motorcycle frame and minimum overall weight.

Additional structural reinforcement may be provided by the frame of the present invention without the requirement of additional members. As shown best in FIG. 3, through the parallel runs 16, the upper and lower frame tubes of each frame section are laterally offset relative to one another and vertically situated at an angle from the horizontal relative to one another. Specifically, the upper frame tube of each parallel run is situated higher than the laterally outwardly from the lower frame tube of the same frame section. In this way, both the lateral and longitudinal bending strengths of the resultant frame section are increased, since the upper and lower frame tubes tend to reinforce one another. For example, the weight of the passengers directed vertically downward through the passenger compartment tends to longitudinally bend the frame tubes. If the frame tubes were situated side-by-side the resultant bending strength would approximately equal the sum of their individual strengths. But when positioned at an angle relative to one another in accordance with the present invention, the tubes tend to slip longitudinally relative to one another upon bending because of their offset height. This longitudinal slippage is resisted however, by the connection between the upper and lower tubes at the frame cross members 46 and 48. Similarly, lateral forces against the motorcycle frame are resisted by the combined effect of the offset tubes in the same manner.

Furthermore, regarding overall strength, it is thought that the greater load of the motorcycle frame will be borne by the upper frame tubes. Accordingly, it is preferred that the upper frame tube of each frame section has a larger diameter or cross section than its respective lower frame tube of the same frame section. This is also advantageous in that the smaller lower frame tubes are somewhat boxed in (FIG. 3) and shielded by these larger and stronger upper frame tubes through the parallel runs of the frame.

Merging the frame tubes from their spaced apart offset positions through the parallel runs into the upper centrally positioned steering post is preferably accomplished by connecting the lower tubes to the steering post at a position axially below the connection of the steering post to the upper tubes. In this way, the frame design is simplified in that tubes of each frame section need not cross over one another, and the strength of the individual tubes is maximized since the bends 18 and 20 may be smooth and slight.

Likewise, the lateral spacing between the upper and lower frame tubes must be equalized at some point forward of the point of convergence 38. Whereas each upper frame tube is laterally spaced from the longitudinal vertical plane by a first uniform distance X (FIG. 2) throughout the parallel run and rearwardly thereof to the point of convergence 38, each lower frame tube is laterally spaced from the longitudinal vertical plane by a second uniform distance Y throughout the parallel run 16. Rearwardly thereof, each lower frame tube flares laterally outwardly to the first uniform distance X in order to define an engine compartment having a generally rectangular cross section.

To improve the stability of the motorcycle as well as to reduce its resultant wind resistance, the parallel runs 16 and cross members 46 and 48 are constructed to define the bottom of an elongated passenger compartment in which a driver and passenger may be situated in front-to-back relationship. In this manner, the weight of each rider is centered about the central vertical plane VP as opposed to a side-by-side positional relationship in which the probably unequal weights of the riders must counteract one another in order to balance the motorcycle. Likewise, the total area of the wind resisting surface presented by the motorcycle vehicle is minimized with the passengers arranged one in front of the other, particularly when they are situated in front of, as opposed to above, the motorcycle's engine compartment 36. Since the riders' legs need not straddle the motorcycle engine in this position, they may be brought somewhat close together in front of the upper body of the passengers thereby further minimizing wind resistance.

The importance of situating the passenger compartment longitudinally in front of the engine compartment and approximately in the same height range can hardly be overemphasized. In this connection, however, it is also essential that the center of gravity of the overall motorcycle be above the wheel or axle centerline. Only in this way are the passengers able to balance the motorcycle. Conversely, if the center of gravity is below the wheel centerline, the vehicle handles similar to a child's scooter, which may be steered but not balanced. This vertical position of the center of gravity thus accounts for the fact that most anyone can readily ride a scooter, whereas one must learn to ride a bicycle. Note, however, that the construction of the motorcycle frame does not necessarily determine the wheel axle positions. For example, the design of the front wheel fork, be it long, short, curved or straight, will effect both the vertical and longitudinal position of the front wheel axle. The type of brace means used to secure the rear wheel to the frame may somewhat vary the rear axle position. Nevertheless, the motorcycle frame of the present invention is so constructed as to facilitate the construction of a motorcycle which accomplishes the desired balancing result. Steering post 14 is situated above the horizontal plane HP intersecting the parallel runs of the frame. Likewise, the engine compartment 36 is constructed so as to be positioned mostly above the horizontal plane, as shown in FIG. 1. The relationship of the horizontal plane to the axle centerline is not fixed but rather, the frame as defined, favorably lends itself to the construction of a motorcycle having an axle centerline no higher than the horizontal plane.

In FIG. 5, a modified form of the present invention is shown. A pair of frame tubes 60 are situated generally symmetrically about a longitudinal vertical plane (not shown) which is located between the frame tubes. The frame shown in FIG. 5 is similar to that shown in FIGS. 1 and 2 in that frame tubes 60 closely resemble the upper frame tubes 10 of the frame of FIG. 1. No continuous lower frame tube however, is utilized in FIG. 5; the same being replaced by segmented shorter members for supporting the steering post and motorcycle engine respectively. The frame tubes 60 have parallel run portions 62 arranged in a spaced-apart relationship through a medial portion of the frame to define the bottom of a passenger compartment. The parallel run portions 62 which extend between first bends 64 and second bends 66 along the frame tubes, are laterally opposite one another and within a horizontal plane HP'.

The steering post 68 is centered within the vertical plane and rigidly connected to a front end of each of the frame tubes 60 for retaining the motorcycle front wheel fork. The front ends of the tubes may be cut to conform to the peripheral surface of the steering post so they may be welded directly to it. Otherwise, a suitable bracket or other fastening means may be provided to form a rigid connection between the tubes and steering post. Connecting steering post 68 with the parallel run portions 62 are steering post support portions 70 which extend rearwardly from the steering post and flare laterally outwardly and downwardly therefrom. The steering post support portions extend from the front end of the tubes 60 to and through bends 64. Since this frame does not include continuous lower frame tubes, a steering post brace 72 is rigidly connected between each steering post support portion 70 and the steering post 68 in order to reinforce the steering post relative to the frame. Rearwardly of the parallel run portions 62, the frame tubes have horizontal rearwardly projecting portions 74 which define the top of an engine compartment 76 at the rear of the frame. The horizontal portions 74 are situated approximately at the height of the steering post 68 to assure that the engine compartment is thus located directly in back of as opposed to below the passenger compartment. Between the parallel run portion 62 and horizontal portion 74, the tubes have upwardly and rearwardly inclined portions 78 which complete the continuous length of the tubes 62 from the steering post 68 in the front rearwardly through the engine compartment 76. Inclined portions 78 extend from and through the second bends 66 to and through upper third bends 80 which curve into the horizontal portion 74. Like the prior embodiment described above, at least one frame cross member 82 laterally spans the motorcycle frame at a point rearwardly of the steering post support portions 70 so as to fix the lateral positional relationship between the frame tubes 60. Each cross member 82 is rigidly fastened to each tube. Additional rear cross bars 84, such as described in connection with the former embodiment, may be inserted to provide additional lateral reinforcement through the engine compartment 76 of the frame.

The motorcycle engine may be suspended from the inclined portion 78 and horizontal portion 74 in any convenient manner, preferably with some type of support members. It may be desirable, however, to construct an engine compartment 76 similar to that shown in the embodiment of FIGS. 1 and 2. This may be accomplished by connecting an engine support member 86 to each frame tube 60 so that the support members 86 define the bottom of the engine compartment 76. The front end of the engine support member 86 is connected either to the parallel run portion 62 as shown, or to the inclined portion 78 approximately at its connection to the parallel run portion. From the point of connection at the front end, the engine support member extends rearwardly and then converges upwardly toward the horizontal portion 74 to which it is rigidly connected at the point of convergence 88 such as by welding or other suitable means. The engine support members 86 may dip slightly below the horizontal plane HP' before converging upwardly in order to form a somewhat cradle-shaped engine compartment substantially similar to the engine compartment of conventional motorcycles in which the riders are postioned above the engine compartment. In this way, many conventional engines, transmissions and engine support means may be readily assembled onto the frame of the present invention just as in the conventional type frames for which they were designed.

Thus, there has been provided in accordance with the present invention, a motorcycle frame having a simplified tubular construction over a lengthened wheel base. The lengthened wheel base provides greater flexibility for increased passenger comfort and provides room for positioning the passengers in front of the motorcycle engine, thereby removing them from the heat and noise incident to the motorcycle engine during operation. The lower position of the passengers improves the possible performance of the motorcycle by lowering the center of gravity which improves stability and by decreasing the wind resistance which must be overcome during the operation of the motorcycle. The frame of the present invention is not only suitable for constructing a more comfortable motorcycle but is also particularly adapted for high performance cycles such as are used in drag racing. The position of the passengers in front of the motorcycle engine helps hold the front wheel down on the road surface during rapid acceleration and the open unrestricted engine compartment is readily adaptable for any of a wide variety of power sources.

It will be understood that modifications and variations may be effected without departing from the scope of the novel concepts of the present invention.

I claim:

1. A motorcycle frame comprising:
    a pair of frame sections, each comprising an upper and a lower frame tube, said frame sections being situated generally symmetrically about a longitudinal vertical plane located between the frame sections, the tubes of each section being juxtaposed to one another substantially in a parallel run relation at a medial portion of the frame to define the bottom of a passenger compartment, said parallel runs being laterally opposite one another and within a horizontal plane,
    a steering post generally centered within said vertical plane and rigidly connected to one end of the frame tubes for retaining a motorcycle front wheel fork,
    steering post support portions of said tubes interconnecting the steering post with said parallel runs, said steering post support portions extending rearwardly from the steering post and flaring laterally outwardly and downwardly therefrom,
    the upper and lower frame tubes being elongated generally cylindrical members,
    the upper frame tube of each frame section having a larger diameter than its respective lower frame tube of the same frame section,
    the upper and lower frame tubes of each frame section vertically diverging rearwardly of the parallel runs and converging back together to define an engine compartment located behind the passenger compartment and mostly above the horizontal plane, said tubes being rigidly connected at the point of convergence, and
    at least one frame cross member laterally spanning the motorcycle frame rearwardly of the steering post support portions and fastened to at least one tube of each frame section.

2. A motorcycle frame according to claim 1 wherein the bottom of the passenger compartment is generally elongated and constructed to support a driver and passenger situated in front to back relationship.

3. A motorcycle frame according to claim 2 wherein the upper and lower frame tubes of each parallel run are laterally offset relative to one another and vertically situated at an angle from the horizontal relative to one another.

4. A motorcycle frame according to claim 3 wherein the upper frame tube of each parallel run is situated higher than and laterally outwardly from the lower frame tube of the same frame section.

5. A motorcycle frame according to claim 3 wherein the frame cross member further defines the bottom of the passenger compartment, said cross member being rigidly attached to the upper and lower frame tubes of both parallel runs.

6. The motorcycle frame of claim 5 wherein the frame cross member comprises a pair of spaced apart generally vertical transverse plates, each vertical plate having a generally arcuate concave upper edge, said vertical plates being connected by top and bottom plates to form a generally enclosed frame section.

7. A motorcycle frame according to claim 5 wherein the lower tubes are connected to the steering post at a position axially below the connection of the steering post to the upper tubes.

8. A motorcycle frame according to claim 7 wherein each upper frame tube is laterally spaced from the longitudinal vertical plane by a first uniform distance throughout the parallel run and rearwardly thereof to said point of convergence, each lower frame tube being laterally spaced from the longitudinal vertical plane by a second uniform distance throughout the parallel run, and rearwardly thereof flaring laterally outwardly to said first uniform distance to define an engine compartment having a generally rectangular cross section.

9. The motorcycle frame of claim 5 further comprising at least one rear crossbar laterally spanning the engine compartment and attached to at least one frame tube of each frame section.

10. A motorcycle frame comprising:
    a pair of frame tubes situated generally symmetrically about a longitudinal vertical plane located between the frame tubes, said tubes having parallel run portions arranged in a spaced apart relationship through a medial portion of the frame to define the bottom of a passenger compartment, said parallel run portions being laterally opposite one another and within a horizontal plane,
    a steering post generally centered within said vertical plane and ridigly connected to one end of the frame tubes for retaining a motorcycle front wheel fork,
    steering post support portions of said tubes extending forwardly from a first upwardly directed bend in said parallel run portions and inter-connecting the steering post with said parallel run portions, said steering post support portions extending rearwardly from the steering post and flaring laterally outwardly and downwardly therefrom,
    steering post brace means rigidly connected to the steering post and steering post support portions of each frame tube to reinforce the steering post relative to the frame,
    a first upper generally horizontal rearwardly projecting portion of each tube defining the top of an engine compartment at the rearwardmost part of the frame approximately at the height of the steering post, and a second lower generally horizontal portion of each tube located below and substantially parallel to each first generally horizontal portion to define the bottom of said engine compartment,
    said tubes each having an upwardly extending portion extending upwardly from a second bend in each of said frame tubes to define generally the rearward limit of the passenger compartment and interposed between its respective parallel run portion and the generally horizontal portion to complete the continuous length of said tubes from the steering post in the front rearwardly through the engine compartment, said upper horizontal portion of each tube being joined to its adjacent upwardly extending portion by a third bend in each frame tube, said third bend joining the axis of said upper horizontal portion, and
    at least one frame cross member laterally spanning the motorcycle frame rearwardly of the steering post support portions and fastened to each of said tubes.

11. A motorcycle frame according to claim 10 in which each upwardly extending portion is inclined rearwardly, each second generally horizontal portion which defines the bottom of the engine compartment extending rearwardly approximately from the connection between the parallel run and said inclined portion and then converging upwardly into the first horizontal portion of its respective tube and to which it is rigidly connected at the point of convergence.

* * * * *